United States Patent
De Meerschman et al.

(10) Patent No.: US 10,618,642 B2
(45) Date of Patent: Apr. 14, 2020

(54) POWER TRANSMISSION SYSTEM AND AN AIRCRAFT HAVING A ROTARY WING

(71) Applicant: AIRBUS HELICOPTERS, Marignane (FR)

(72) Inventors: Olivier De Meerschman, Lambesc (FR); Olivier Barais, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 754 days.

(21) Appl. No.: 15/265,018

(22) Filed: Sep. 14, 2016

(65) Prior Publication Data

US 2017/0073066 A1    Mar. 16, 2017

(30) Foreign Application Priority Data

Sep. 16, 2015    (FR) ..................... 15 01920

(51) Int. Cl.
| | | |
|---|---|---|
| *B64C 27/12* | (2006.01) | |
| *F16H 1/28* | (2006.01) | |
| *B64C 27/06* | (2006.01) | |
| *B64C 27/82* | (2006.01) | |
| *F16H 57/00* | (2012.01) | |

(52) U.S. Cl.
CPC ............... B64C 27/12 (2013.01); F16H 1/28 (2013.01); *B64C 27/06* (2013.01); *B64C 27/82* (2013.01); *F16H 2057/0087* (2013.01)

(58) Field of Classification Search
CPC ......... B64C 27/06; B64C 27/82; B64C 27/12; F16H 1/12; F16H 1/18; F16H 1/28203; F16H 1/206; F16H 1/222; F16H 2048/385; F16H 2057/0087; F16H 2055/173; F05D 2260/4031

See application file for complete search history.

(56) References Cited

U.S. PATENT DOCUMENTS

| | | | |
|---|---|---|---|
| 2,911,851 A | 11/1959 | Wachs | |
| 4,811,627 A | 3/1989 | Mouille | |
| 6,042,499 A | 3/2000 | Goi et al. | |
| 8,967,532 B2 | 3/2015 | Vialle | |

(Continued)

FOREIGN PATENT DOCUMENTS

| | | |
|---|---|---|
| FR | 2568541 | 2/1986 |
| FR | 2964948 | 3/2012 |

OTHER PUBLICATIONS

Brown et al. Flight Apr. 21, 1949, pp. 453-459, "Fairey Gyrodyne, Design Survey of the World's Fastest Helicopter".

(Continued)

*Primary Examiner* — Richard A Edgar
*Assistant Examiner* — Maxime M Adjagbe
(74) *Attorney, Agent, or Firm* — Brooks Kushman P.C.

(57) ABSTRACT

A power transmission system having at least one inlet speed-reducing gear and a main speed-reducing gear, each inlet speed-reducing gear comprising an inlet pinion meshing with an inlet gearwheel. The inlet gearwheel is constrained to rotate with a main pinion of the main speed-reducing gear, the main pinion meshing with a main gearwheel. At least one inlet gearwheel is secured to reversible connection means in order to be capable of driving a first additional drivetrain connected to an additional rotor.

20 Claims, 4 Drawing Sheets

(56) References Cited

U.S. PATENT DOCUMENTS

2006/0269414 A1     11/2006   Palcic et al.
2012/0068007 A1*    3/2012    Vialle ................. B64C 27/14
                                                            244/17.19

OTHER PUBLICATIONS

French Search Report for French Application FR 1501920 completed by French Patent Office dated Jun. 9, 2016.
Website https://static1.squarespace.com/static/5266a0bae4b011999b2d65a0/t/527437b4e4b0298e6ac56bec/1383348148438/AVX+Rotor+System.jpg, 1 Page Image, AVX Rotor System, AVX Aircraft Company 2013.
Website https://static1.squarespace.com/static/5266a0bae4b011999b2d65a0/t/5274344ae4b0a439bc1b3da8/1383347274146/OH58DAVXConversionProcess.jpg, 1 Page Image, OH-58D/ AVX, Conversion Process, AVX Aircraft Company 2013.
Website https://static1.squarespace.com/static/5266a0bae4b011999b2d65a0/t/52743529e4b0a23a823b1810/1383347497277/OH58DAVXAssembly.jpg, Install AVX rotor head and blades, AVX Aircraft Company 2013.
Website https://static1.squarespace.com/static/5266a0bae4b011999b2d65a0/t/5274348ce4b0a23a823b1774/1383347340029/OH-58_Stripped.jpg, 1 Page Image Remove sight, rotor hear and blades, AVX Aircraft Company 2013.
Website www.avxaircraft.com, OH-58D/AVX conversion process, AVX Aircraft Company 2013, 6 Pages, "OH-58D/AVX conversion process".

* cited by examiner

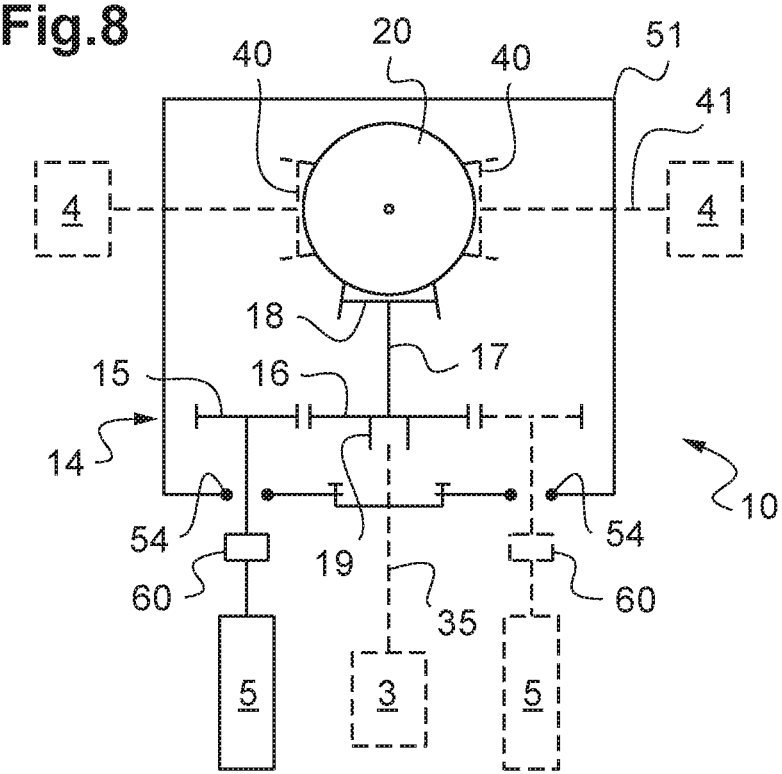
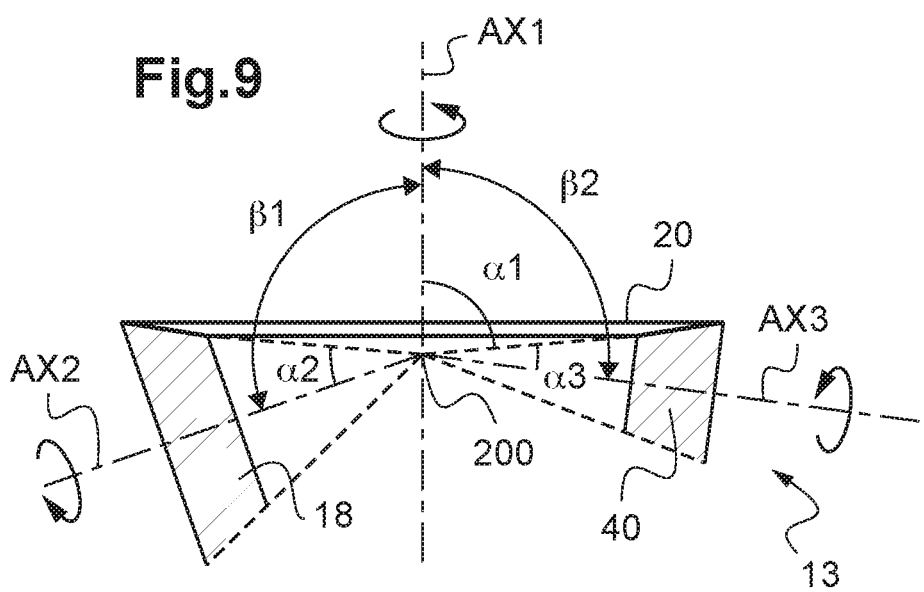

POWER TRANSMISSION SYSTEM AND AN AIRCRAFT HAVING A ROTARY WING

CROSS REFERENCE TO RELATED APPLICATION

This application claims priority to French patent application No. FR 15 01920 filed on Sep. 16, 2015, the disclosure of which is incorporated in its entirety by reference herein.

BACKGROUND OF THE INVENTION (1) Field of the Invention

The present invention relates to a power transmission system and also to an aircraft having both a rotary wing and such a power transmission system.

The invention thus lies in the field of main gearboxes for rotorcraft.

(2) Description of Related Art

In particular, a rotorcraft type aircraft has a rotor that contributes at least in part to providing the aircraft with lift. A helicopter may thus have a rotor referred to as a "main" rotor that contributes to providing the helicopter with lift and with propulsion, and a rotor referred to as a "tail" rotor that contributes to controlling yaw movement of the helicopter.

An aircraft referred to as a "hybrid" aircraft for convenience may have a rotor referred to as a "main" rotor that contributes to providing it with lift and propulsion, together with at least one lateral rotor contributing to propelling the hybrid aircraft and to controlling the yaw movement of the aircraft.

In order to rotate each rotor, a rotorcraft is provided with a power plant comprising at least one engine.

In addition, a power transmission system is arranged between the engine(s) and each rotor in order to enable the rotors to be rotated. A power transmission system serves in particular to drive the rotor at a speed of rotation that is low compared with the high speed of rotation of the engine. By way of illustration, an engine of the turboshaft engine type possesses a drive shaft that rotates at a speed of the order of several tens of thousands of revolutions per minute, while the main rotor rotates at a speed that may, by way of example, lie in the range 250 revolutions per minute (rpm) to 450 rpm. By way of information, the lateral rotors of the hybrid aircraft rotate at a speed of about 2000 rpm, for example, while a tail rotor rotates at a speed of about 5000 rpm, for example.

A helicopter may be provided with at least two engines. Each engine drives a main gearbox of the power transmission system, possibly via at least one overrunning clutch or "freewheel". Such a main gearbox is known under the acronym MGB. The main gearbox then drives the main rotor in rotation.

A power transmission system of a prior art helicopter presents one inlet mechanical drive system per engine. Each inlet mechanical drive system is thus driven by one engine. The inlet mechanical drive systems serve to drive a combining gearwheel. The combining gearwheel then drives a main gearbox. In particular, the combining gearwheel is constrained to rotate with a pinion of the main gearbox. That pinion then drives rotation of a main gearwheel of the main gearbox. The main gearwheel then drives a rotor mast via at least one epicyclic speed-reducing stage. In addition, the combining gearwheel drives the tail drivetrain.

Document U.S. Pat. No. 2,911,851 describes a main gearbox suitable for driving a main rotor and a tail drivetrain.

Document FR 2 568 541 describes an alternative architecture. The main gearbox comprises one inlet mechanical drive system per engine. Each inlet mechanical drive system is thus driven by a respective engine. The inlet mechanical drive systems drive a combining gearwheel that drives the tail drivetrain. In addition, each inlet mechanical drive system meshes with a first speed-reducing stage engaged with a main gearwheel. The main gearwheel drives a rotor mast via a second speed-reducing stage that is epicyclic.

A hybrid aircraft may be provided with at least two engines. In a known transmission system, each engine drives a pinion referred to as a "first" pinion, for convenience. Each first pinion drives an inlet mechanical drive system. Each inlet mechanical drive system is thus driven by one engine, via an inlet pinion, in particular. The inlet mechanical drive systems act jointly to set a main gearwheel into motion. The main gearwheel then drives a rotor mast via at least one epicyclic speed-reducing stage.

Furthermore, each first pinion drives a lateral drivetrain. Each lateral drivetrain may be relatively complex in order to follow a non-rectilinear path so as to reach a lateral rotor. For example, a lateral drivetrain may include angle transmission means of non-negligible weight.

The architecture of a helicopter power transmission system thus differs from the architecture of a hybrid aircraft power transmission system. As a result, the main gearbox of a helicopter is therefore different from the main gearbox of a hybrid aircraft.

To illustrate this aspect, the Internet site www.avxaircraft.com presents a page entitled "OH-58D/AVX conversion process". Four drawings show diagrammatically a process for transforming a helicopter having a main rotor and a tail rotor into an aircraft having two contrarotating main rotors and two ducted thrusters. In that process, the power transmission system needs to be changed during the transformation, with each aircraft having its own power transmission system.

Documents FR 2 964 948, U.S. Pat. No. 6,042,499, and US 2006/269414 are also known.

BRIEF SUMMARY OF THE INVENTION

An object of the present invention is thus to propose an alternative power transmission system.

The present invention thus provides a power transmission system for a rotorcraft. The power transmission system has at least one inlet speed-reducing gear rotating a main speed-reducing gear, the main speed-reducing gear being mechanically connected to a rotor mast for driving a main rotor of the rotorcraft in rotation, the main rotor contributing at least in part to providing the rotorcraft with lift, each inlet speed-reducing gear comprising at least one inlet pinion meshing with an inlet gearwheel, each inlet pinion being for driving by an engine, the main speed-reducing gear having one main gearwheel per inlet speed-reducing gear, the main speed-reducing gear having one main gearwheel meshing with each main pinion, each main pinion being connected by a respective connection shaft to a respective inlet gearwheel.

By way of example, each main pinion is connected by a connection shaft to an inlet gearwheel forming a two-pinion assembly, which might possibly be H-shaped. Such a connection shaft may have one or more interconnected segments.

A main pinion and an inlet gearwheel may be connected together solely by a single connection shaft, without passing via a freewheel, for example. The main pinion and the inlet gearwheel may be fastened to two respective end zones of the connection shaft. Alternatively, the main pinion with the connection shaft and the inlet gearwheel may be component portions of a single mechanical part.

At least one inlet gearwheel is constrained to rotate about an axis of rotation of the inlet gearwheel of reversible connection means designed to be able to drive a first additional drivetrain connected to an additional rotor of said rotorcraft, said additional drivetrain being an optional member that need not be mounted on said power transmission system.

The reversible connection means may be secured directly to the two-pinion assembly, and for example to the inlet gearwheel, and may then be carried by the two-pinion assembly. For example, the reversible connection means and the two-pinion assembly may be two portions of a single mechanical part, or the reversible connection means may be fastened directly to the two-pinion assembly by conventional means of screw fastener and/or welding and/or adhesive bonding and/or riveting type.

Consequently, the power transmission system may be driven by at least one engine. Independently of the number of engines, each engine causes an inlet speed-reducing gear to rotate.

Under such circumstances, the inlet speed-reducing gears together set the main gearwheel into rotation via main pinions. The main gearwheel acts directly or indirectly to rotate the rotor mast. The rotor mast drives the main rotor in rotation.

Furthermore, the power transmission system may possibly drive at least one additional rotor.

A first additional drivetrain may drive rotation of a lateral rotor contributing to propelling the rotorcraft, or of a yaw movement control rotor of the rotorcraft.

In addition, the power transmission system is dimensioned as a function of at least one additional pinion that may optionally mesh with the main gearwheel. This additional pinion may also generate rotation of a rotor.

In a first use, the mechanical power transmission system may thus be arranged on a hybrid aircraft. For example, two lateral rotors are driven respectively by two reversible connection means.

Connecting a lateral drivetrain directly to an inlet gearwheel, in contrast to a system meshing by an inlet pinion as in the above-described prior art, presents an advantage that is not negligible. Specifically, during forward flight, it can happen that a lateral rotor starts delivering drive to the power transmission system. In the prior art, that mode of operation tends to degrade the teeth of the inlet pinion, in particular. The invention makes it possible to avoid that phenomenon by using robust reversible connection means.

In a second use, the mechanical transmission system may be arranged on a helicopter. For example, two inlet speed-reducing gears are driven respectively by two engines. The two inlet speed-reducing gears drive a main rotor in rotation via the main gearwheel.

Furthermore, a tail rotor may be driven either by the main gearwheel using an embodiment that is described below, or optionally by both engines via an auxiliary combining gearwheel.

Consequently, the Applicant has gone against prejudices by defining an innovative power transmission system suitable for being arranged on multiple types of aircraft. Conversely, existing prejudices tend to require a respective main gearbox to be provided for each type of aircraft.

The use of a power transmission system having identical mechanical assemblies both on a helicopter and on a hybrid aircraft is particularly innovative in that a lateral rotor of a hybrid aircraft rotates at a speed that is equal to substantially half the speed of rotation of a tail rotor.

By going against those prejudices, the invention thus makes it possible to obtain a transmission system with a variety of uses.

The power transmission system may also include one or more of the following characteristics.

Under such circumstances, the power transmission system may include at least one additional pinion meshing with the main gearwheel in order to drive a second additional drivetrain for an auxiliary rotor of the rotorcraft.

The power transmission system may include permanently or occasionally an additional pinion making it possible, where necessary, to connect a second additional drivetrain for a tail rotor of a helicopter or for a lateral rotor of a hybrid aircraft.

Such an additional pinion may also drive accessories, e.g. such as a pump or an alternator. The additional pinion may be arranged on any transmission system for driving accessories and/or an additional drivetrain for a yaw movement control rotor of a helicopter.

Furthermore, each connection shaft extends along a transverse axis of symmetry, the main gearwheel presenting an axis of symmetry in elevation, the transverse axis presenting a first angle relative to the axis in elevation, the main gearwheel presenting a first number of teeth, each main pinion presenting a second number of teeth, the first number of teeth and the second number of teeth being a function:

of the first angle;

of a first speed of rotation to be reached by said main gearwheel;

of a second speed of rotation to be reached by each main pinion;

of a third number of teeth of an additional pinion that might mesh with the main gearwheel in order to drive a second additional drivetrain for a yaw movement control rotor of the rotorcraft, the additional pinion being an optional member that need not be mounted on the main transmission system; and of a second angle between said axis in elevation and an axis of rotation of the additional pinion.

Optionally, a third speed of rotation to be reached by each additional pinion is also taken into account.

Consequently, regardless of whether an additional pinion is or is not present on the power transmission system, the additional pinion is taken into account when determining the dimensions of the main gearwheel and of the main pinions. Designing a transmission system as a function of equipment that might possibly not be present is not obvious.

Consequently, each additional pinion can be fitted to the power transmission system, where necessary.

In addition, making such a mechanical system is not obvious because of the angles to be complied with that are formed between the various members and because of the speeds of rotation that are to be reached. Predetermined angles need to be complied with in order to avoid making use of angle transmissions, which by their very nature are heavy. The knowledge of the person skilled in the art tends to indicate that such a power transmission system cannot be obtained because of the large number of constraints. The Applicant has overcome these prejudices in order to provide a power transmission system that is viable in spite of constraints that are not negligible.

In particular, such determining of dimensions might appear difficult or indeed impossible to achieve in the presence of first and second angles that are different and greater than 90 degrees.

Furthermore, the power transmission system may include a secondary speed-reducing gear interposed between the main gearwheel and the rotor mast. The secondary speed-reducing gear may for example be provided with at least one epicyclic speed-reducing stage.

In addition, the power transmission system comprises a main gearbox having a casing, and the inlet speed-reducing gear and the main speed-reducing gear are arranged in the casing.

The casing may include access means in order to have access to each reversible connection means. The access means may for example be in the form of a hatch closed by a cover. Alternatively, the casing may comprise subassemblies that are releasably fastened to one another.

Where appropriate, the power transmission system includes an additional pinion engaged with the main gearwheel in order to drive a second additional drivetrain for a yaw movement control rotor of the rotorcraft, the additional pinion being arranged in the casing.

In addition, the casing may include a hatch enabling an operator to install an additional pinion, where necessary, as a function of how the power transmission system is used.

The additional pinion may also be secured to an outlet shaft projecting outside the casing in order to be suitable for driving the additional drivetrain, or indeed accessories.

Specifically, the power transmission system may include an accessory module mechanically connected to the outlet shaft.

Furthermore, the power transmission system may include at least one inlet drivetrain connected to an inlet pinion, the inlet drivetrain being for interposing between an inlet pinion and an engine, the inlet drivetrain comprising at least one member selected from a list comprising a freewheel, a speed-reducing gear, and a speed-increasing gear.

The inlet drivetrain may be positioned in part inside the casing, a shaft of this inlet drivetrain projecting from the casing in order to be mechanically connected to an engine.

Furthermore, the reversible connection means of an inlet speed-reducing gear may include fluting constrained to rotate with an inlet gearwheel, or indeed directly carried by the inlet gearwheel.

Fluting represents a mechanical member that is robust and that can easily be engaged around or in a shaft of a first additional drivetrain.

As an alternative or in addition, the reversible connection means may include screw fastener means suitable for securing a first drivetrain to an inlet gearwheel.

For example, an inlet gearwheel may be constrained by means of bolts or the equivalent to rotate with a shaft or a member that accommodates misalignments.

Keyed connections are also possible.

Furthermore, in a first embodiment, each first additional drivetrain is for connecting to an additional rotor in the form of a lateral rotor contributing at least in part to propelling the rotorcraft.

Under such circumstances, when the power transmission system includes an optional additional pinion engaged with the main gearwheel to drive a second additional drivetrain, the second additional drivetrain is for connection to an auxiliary rotor in the form of a yaw movement control rotor of the rotorcraft.

In a second embodiment, each first additional drivetrain is for connection to an additional rotor in the form of a yaw movement control rotor, such as a tail rotor of a helicopter.

Under such circumstances, the power transmission system includes at least one optional additional pinion engaging with the main gearwheel to drive a second additional drivetrain, the second additional drivetrain being for connecting to an auxiliary rotor in the form of a lateral rotor that participates at least in part to propelling the rotorcraft.

Independently of the embodiment, the power transmission system is designed to be capable of being used on a helicopter or on a hybrid aircraft.

In addition to a power transmission system, the invention provides a rotorcraft having a "main" rotor contributing at least in part to providing the rotorcraft with lift, the rotorcraft having at least two engines in order to drive the main rotor.

The rotorcraft then includes a power transmission system of the invention of the type described above.

Furthermore, the invention provides a method of determining the dimensions of such a power transmission system.

Each connection shaft extends along a transverse axis of symmetry, said main gearwheel presenting an axis in elevation of symmetry, said transverse axis presenting a first angle relative to said axis in elevation, said main gearwheel presenting a first number of teeth, each main pinion presenting a second number of teeth, and the method includes a determination step during which the first number of teeth and the second number of teeth are determined as a function:
  of said first angle;
  of a first speed of rotation to be reached by said main gearwheel;
  of a second speed of rotation to be reached by each main pinion;
  of a third number of teeth for an additional pinion that might mesh with said main gearwheel in order to drive an additional drivetrain for a yaw movement control rotor of a helicopter, said additional pinion being an optional member that need not be mounted on said main transmission system; and
  of a second angle between said axis in elevation and an axis of rotation of said additional pinion.

Optionally, a third speed of rotation to be reached by the additional pinion is also taken into account.

This method presents the particular feature of defining a main gearwheel and the main pinions as a function in particular of at least one additional pinion that need not be arranged on the power transmission system.

Optionally, the method includes the following steps:
  giving a first setpoint angle value to be satisfied by said first angle, and a second setpoint angle value to be satisfied by said second angle;
  giving a first setpoint speed of rotation value to be satisfied by said main gearwheel, and a second setpoint speed of rotation value to be satisfied by each main pinion, and optionally a third setpoint speed of rotation to be satisfied by each additional pinion;
    giving a first value for the first number of teeth;
    giving a second value for the second number of teeth;
    giving a third value for the third number of teeth;
    determining a "resulting calculation" value by applying the first, second, and third values for numbers of teeth as a function of the second setpoint angle value;
    comparing said resulting calculation value with the first setpoint angle value;
    determining a first speed of rotation for each main pinion and optionally a second speed of rotation of the additional pinion as a function of the first setpoint speed of rotation value and of said first, second, and third values for numbers of teeth; and
    comparing said first speed of rotation with the second setpoint speed of rotation value.

Optionally, an operator may compare the second speed of rotation and the third setpoint speed of rotation value. Nevertheless, the second speed of rotation may be free to allow freedom in determining dimensions.

An operator may define criteria for accepting the comparisons undertaken, such as acceptable ranges of values.

For example, an operator may set arbitrarily the first, second, and third values for numbers of teeth. The operator can then determine:

whether said resulting calculation value is equal to the first setpoint angle value;

whether the first speed of rotation is equal to the second setpoint speed of rotation value; and whether the second speed of rotation is equal to the third setpoint speed of rotation value.

If not, the first, second, and third values for numbers of teeth do not satisfy the criteria that have been established. The operator must then reiterate this operation until obtaining an acceptable result.

For example, the first, second, and third values for numbers of teeth may respectively be equal to 87, 23, and 17 in order to reach a first setpoint angle value equal to 100 degrees plus or minus 1.5 degrees, a second setpoint angle value equal to 96 degrees, a first setpoint speed of rotation value equal to 1200 rpm, a second setpoint speed of rotation value greater than or equal to 4500 rpm, and a third setpoint speed of rotation value equal to 6000 rpm plus or minus 200 rpm.

BRIEF DESCRIPTION OF THE SEVERAL VIEWS OF THE DRAWINGS

The invention and its advantages appear in greater detail from the context of the following description of embodiments given by way of illustration with reference to the accompanying figures, in which:

FIG. 8 is a diagram showing a power transmission system of the invention provided with reversible connection means for driving a yaw movement control rotor; and FIG. 9 is a diagram showing the method of the invention.

Elements present in more than one of the figures are given the same references in each of them.

DETAILED DESCRIPTION OF THE INVENTION

Figure 1:
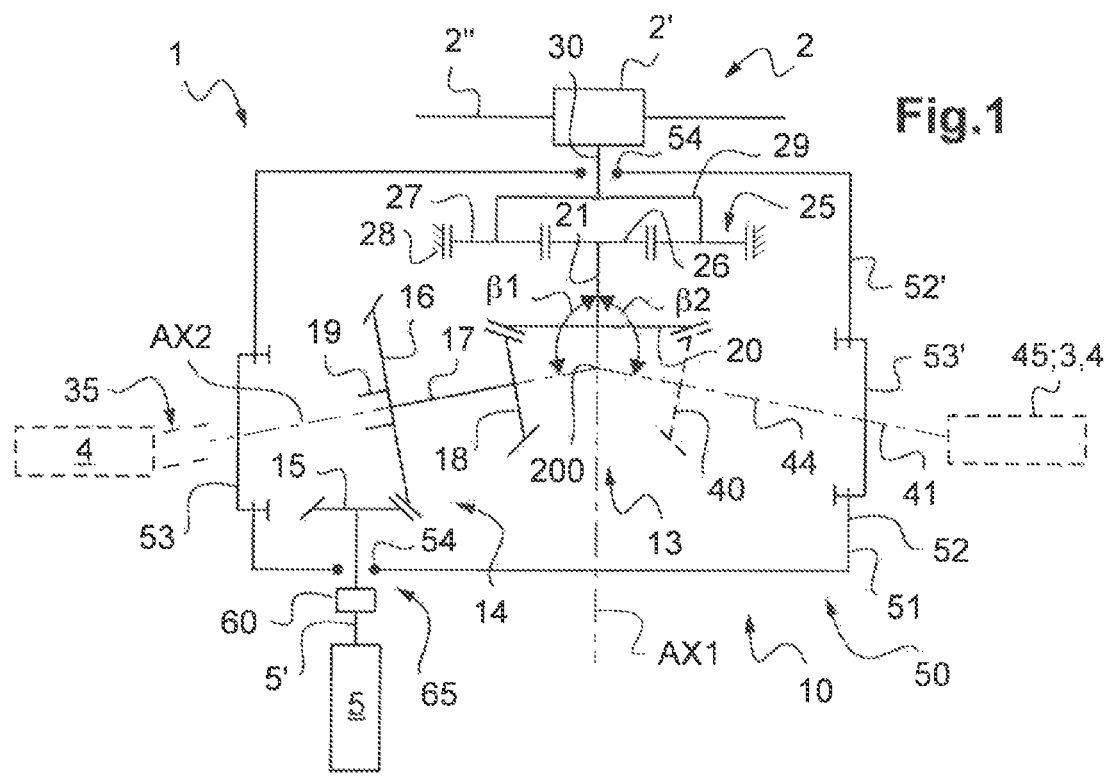
FIG. 1 is a diagram showing a power transmission system of the invention.

FIG. 1 shows a power transmission system 10 of the invention suitable for being arranged on a rotorcraft 1 of the invention.

The power transmission system 10 serves in particular to drive a main rotor 2 contributing to provide the rotorcraft 1 with lift or indeed with propulsion. For example, the main rotor 2 may comprise a hub 2' carrying a plurality of blades 2".

The rotorcraft 1 may be a helicopter, e.g. having a main rotor 2 and a yaw movement control rotor 3, or it may be a hybrid aircraft having a main rotor 2 and at least one lateral rotor 4.

In order to drive the rotors, and independently of the nature of the rotorcraft 1, the rotorcraft 1 possesses a power plant. The power plant has at least one engine 5. Each engine 5 is mechanically connected to the rotors by the power transmission system 10.

The power transmission system 10 has one inlet speed-reducing gear 14 per engine. Each inlet speed-reducing gear 14 is thus in mechanical communication with at least one engine 5.

In this context, each inlet speed-reducing gear 14 is provided with a pinion referred to as the "inlet" pinion 15 for convenience, which pinion is driven directly or indirectly by the engine 5. For example, an engine 5 possesses an outlet shaft 5' that drives the inlet pinion directly or indirectly via a drivetrain referred to as the "inlet" drivetrain 65.

In the alternative of FIG. 1, the outlet shaft 5' drives an inlet drivetrain 65 connected to the inlet pinion 15. By way of example, this inlet drivetrain 65 may include at least one shaft and/or at least one speed-reducing gear and/or at least one freewheel 60 and/or at least one angle transmission means or indeed one speed-increasing gear (not shown).

Figure 2:
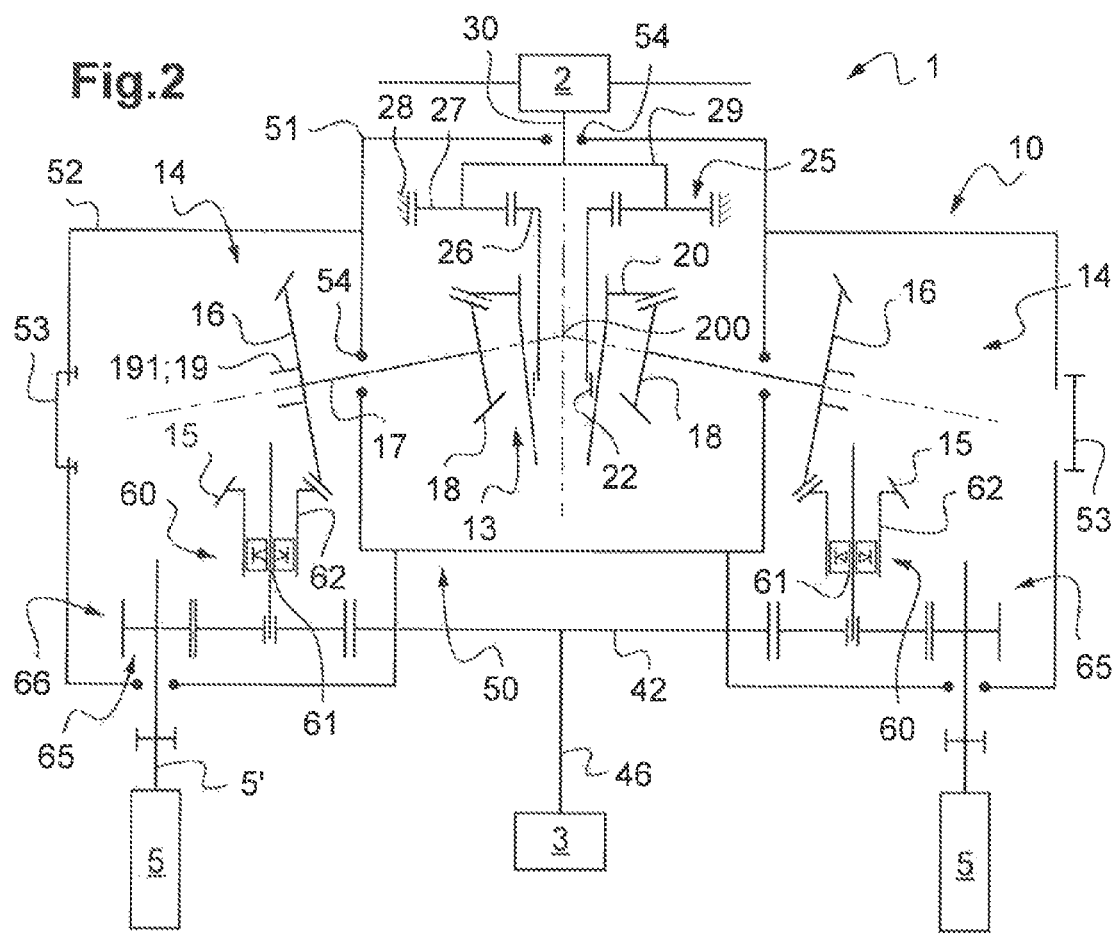
FIG. 2 is a diagram showing a power transmission system of the invention used in a helicopter architecture.

In the example of FIG. 2, an inlet drivetrain 65 includes a speed-reducing gear 66 followed by a freewheel 60. The freewheel comprises a driving member 61 connected to the speed-reducing gear 66. The driving member 61 serves to drive a driven member 62 of the freewheel 60 that is constrained to rotate with the inlet pinion 15. For this purpose, ball or roller bearing members are arranged, e.g. between the driving member 61 and the driven member 62.

The inlet pinion 15 may have bevel teeth, i.e. teeth arranged conically.

Furthermore, and with reference to FIG. 1, each inlet speed-reducing gear 14 includes a so-called "inlet" gearwheel 16. The inlet gearwheel 16 meshes with at least one inlet pinion 15. Under such circumstances, the inlet gearwheel 16 may have bevel teeth.

Each inlet gearwheel 16 is also mechanically connected to a main speed-reducing gear 13.

Thus, each inlet gearwheel 16 is connected to a main pinion 18 of the main speed-reducing gear 13 by a connection shaft 17. Each main pinion 18 may be in the form of a bevel pinion possessing a diameter smaller than the diameter of the corresponding inlet gearwheel 16.

An inlet gearwheel 16 together with a connection shaft 17 and a main pinion 18 can form an assembly referred to for convenience as a "two-pinion" assembly.

In addition, the main speed-reducing gear 13 has at least one combining gearwheel referred to as a "main" gearwheel 20. Each main pinion 18 meshes with the main gearwheel 20. The main gearwheel 20 may thus present bevel teeth.

Under such circumstances, the main gearwheel 20 drives a rotor mast 30 directly or indirectly via a secondary speed-reducing gear 25. The rotor mast 30 is constrained to rotate with the main rotor 2.

Where applicable, the secondary speed-reducing gear 25 may comprise at least one epicyclic speed-reducing stage, for example.

The epicyclic speed-reducing stage comprises a sunwheel 26 constrained to rotate with the main gearwheel 20.

In FIG. 1, a first shaft 21 secured to the main gearwheel 20 drives the epicyclic speed-reducing stage.

In FIG. 2, a first shaft 21 secured to the main gearwheel 20 drives a second shaft 23 secured to the sunwheel 26 by fluting 22.

In addition, and with reference to FIG. 1, the sunwheel meshes with at least one planet wheel 27 also meshing with a peripheral ring 28. Each planet wheel 27 is also carried by a planet carrier 29. The planet carrier 29 may be mechanically connected to the rotor mast 30 as in FIG. 1, or it may be connected to another speed-reducing stage.

Consequently, each engine 5 drives an inlet pinion, possibly via an inlet drivetrain 65. The rotary motion of the various inlet pinions 15 leads to rotation of the inlet gearwheel 16. The rotation of each inlet gearwheel 16 leads to joint rotation of the corresponding main pinion 18, and then of the main gearwheel 20. The main gearwheel then drives the secondary speed-reducing gear 25, if any, the secondary speed-reducing gear 25 driving rotation of the rotor mast 30 of the main rotor 2.

Furthermore, the power transmission system may be arranged equally well on a helicopter or on a hybrid aircraft.

Under such circumstances, at least one inlet gearwheel 16 is constrained to rotate with reversible connection means 19. By way of example, the reversible connection means may be fastened to a two-pinion assembly.

The function of reversible connection means 19 is to enable a first additional drivetrain 35 connected to an additional rotor to be driven in rotation. The additional rotor may be a lateral rotor 4 contributing to propelling the aircraft, or it may be a yaw movement control rotor 3 of the aircraft.

The first additional drivetrain 35 is thus an optional member that need not be mounted on the power transmission system 10.

Furthermore, the power transmission system may include at least one optional additional pinion 40 that is driven by the main gearwheel 20. This additional pinion 40 may thus have bevel teeth.

Furthermore, each additional pinion 40 may be extended by an outlet shaft 44 suitable for driving a second additional drivetrain. The second additional drivetrain is connected to an accessory module 45 and/or to an auxiliary rotor. Such an auxiliary rotor may be a yaw movement control rotor 3 of the aircraft, or it may be a lateral rotor 4.

Furthermore, the power transmission system 10 may include a main gearbox 50 having a casing 51. The casing 51 may comprise a plurality of subassemblies 52, 52' that are fastened to one another.

Under such circumstances, the main speed-reducing gear 13 and each of the inlet speed-reducing gears 14 are arranged within the casing 51. The rotor mast then projects from the casing 51, e.g. passing through a dynamic seal 54.

In addition, reversible connection means 19 may be arranged inside the casing.

Consequently, the casing 51 includes access means 53 giving access to the reversible connection means 19. By way of example, the access means 53 comprise a cover closing an opening in the casing. Where necessary, the cover is removed in order to enable a first additional drivetrain 35 to extend as far as the reversible connection means 19.

Figure 3:
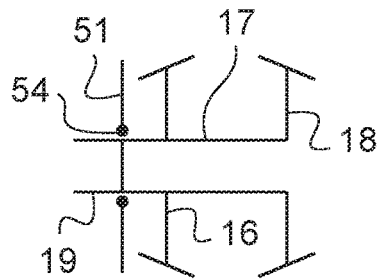
FIG. 3 is a diagram showing a power transmission system provided with inlet speed-reducing gear including reversible connection means projecting outside a casing.

In the alternative of FIG. 3, the reversible connection means 19 may project outside the casing 51, passing through a dynamic seal 54.

Where applicable and with reference to FIG. 1, at least one additional pinion 40 is also arranged within the casing 51. Under such circumstances, the outlet shaft 44 secured to the additional pinion projects outside the casing 51 through a dynamic seal in order to be suitable for driving the second additional drivetrain 41.

Since the additional pinion 40 is optional, the casing 51 may include an opening that is closed in reversible manner, e.g. by a removable plate 53'.

In a first embodiment shown in FIGS. 2, 4, 5, and 6, the power transmission system 10 is provided with at least one reversible connection means 19 that is to drive a lateral rotor 4.

In a first use of the first embodiment, the power transmission system 10 is for a helicopter.

With reference to FIG. 2, the power transmission system 10 has at least one engine 5. Each engine 5 drives rotation of an inlet speed-reducing gear 14. The inlet speed-reducing gears 14 enable the main speed-reducing gear 13 to be driven so as to generate rotation of the main rotor 2.

In addition, the rotorcraft shown is a helicopter. Although present, the reversible connection means 19 are thus not connected to any first additional drivetrain.

In contrast, the power transmission system 10 can be used to drive a yaw movement control rotor 3.

In the first variant of the first use of the first embodiment shown in FIG. 2, a drivetrain 46 connected to the yaw movement control rotor 3 is itself driven by a combining gearwheel 42. The combining gearwheel 42 then meshes with pinions driven by the engines, and for example the pinions of the inlet drivetrains 65.

Figure 4:
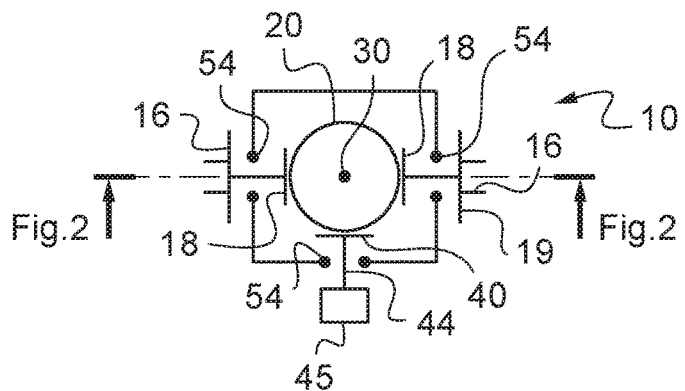
FIG. 4 is a diagram showing a power transmission system having an additional pinion connected to an accessory gearbox.

The additional pinion 40 may be removed in order to lighten the installation, or it may be used to drive at least one accessory module, as shown in FIG. 4.

Figure 5:
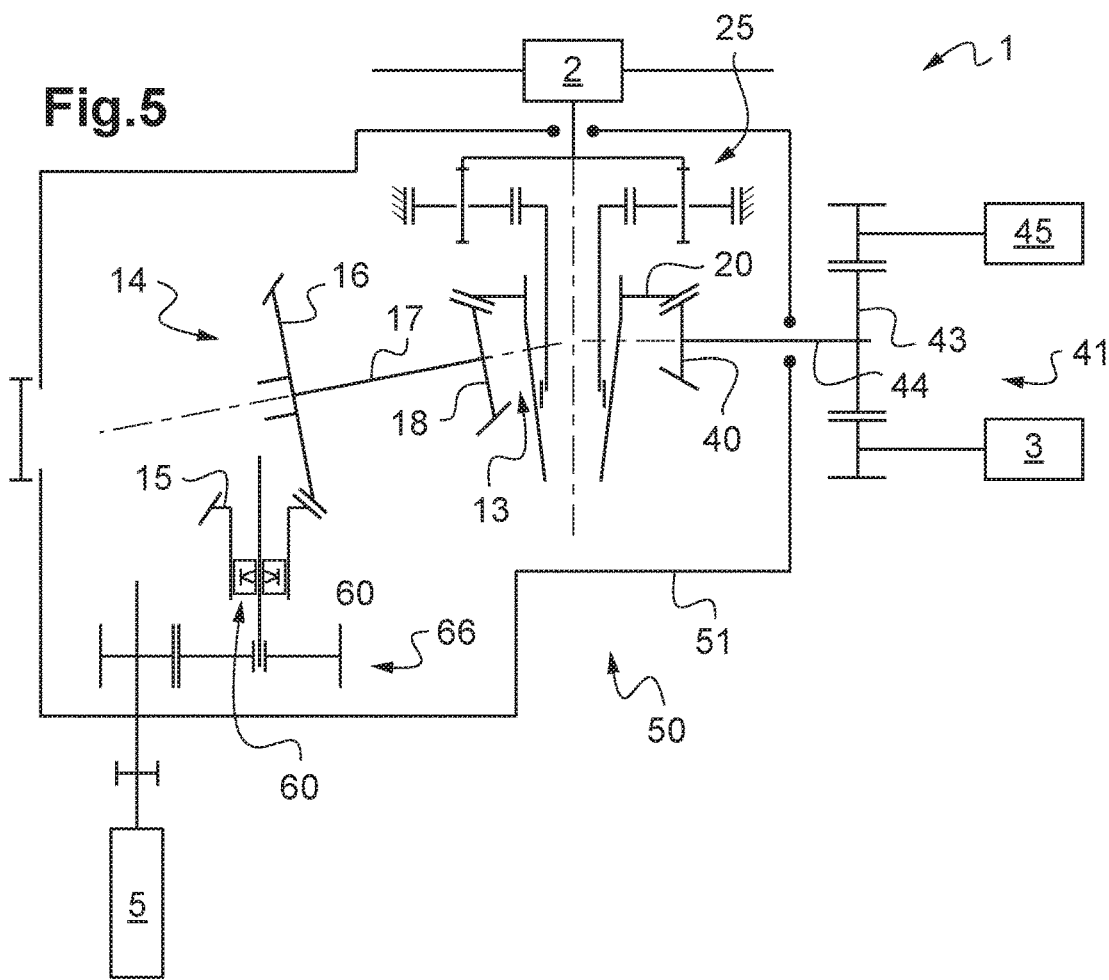
FIG. 5 is a diagram showing a power transmission system having an additional pinion connected to an accessory gearbox and to a rotor for controlling yaw movement of a rotorcraft.

In a second variant of the first use of the first embodiment shown in FIG. 5, an additional pinion 40 meshes with the main gearwheel 20 in order to drive a second additional drivetrain 41.

The second additional drivetrain 41 is connected to a yaw movement control rotor 3. For example, the additional pinion 40 drives an outlet shaft 44 projecting from the casing 51. This outlet shaft 44 is constrained to rotate with an extra pinion 43 of the second additional drivetrain 41.

The extra pinion may be mechanically connected to the yaw movement control rotor 3 or to an accessory module 45.

It should be observed that FIG. 5 shows only one engine 5. Nevertheless, at least two engines may be present.

Figure 6:
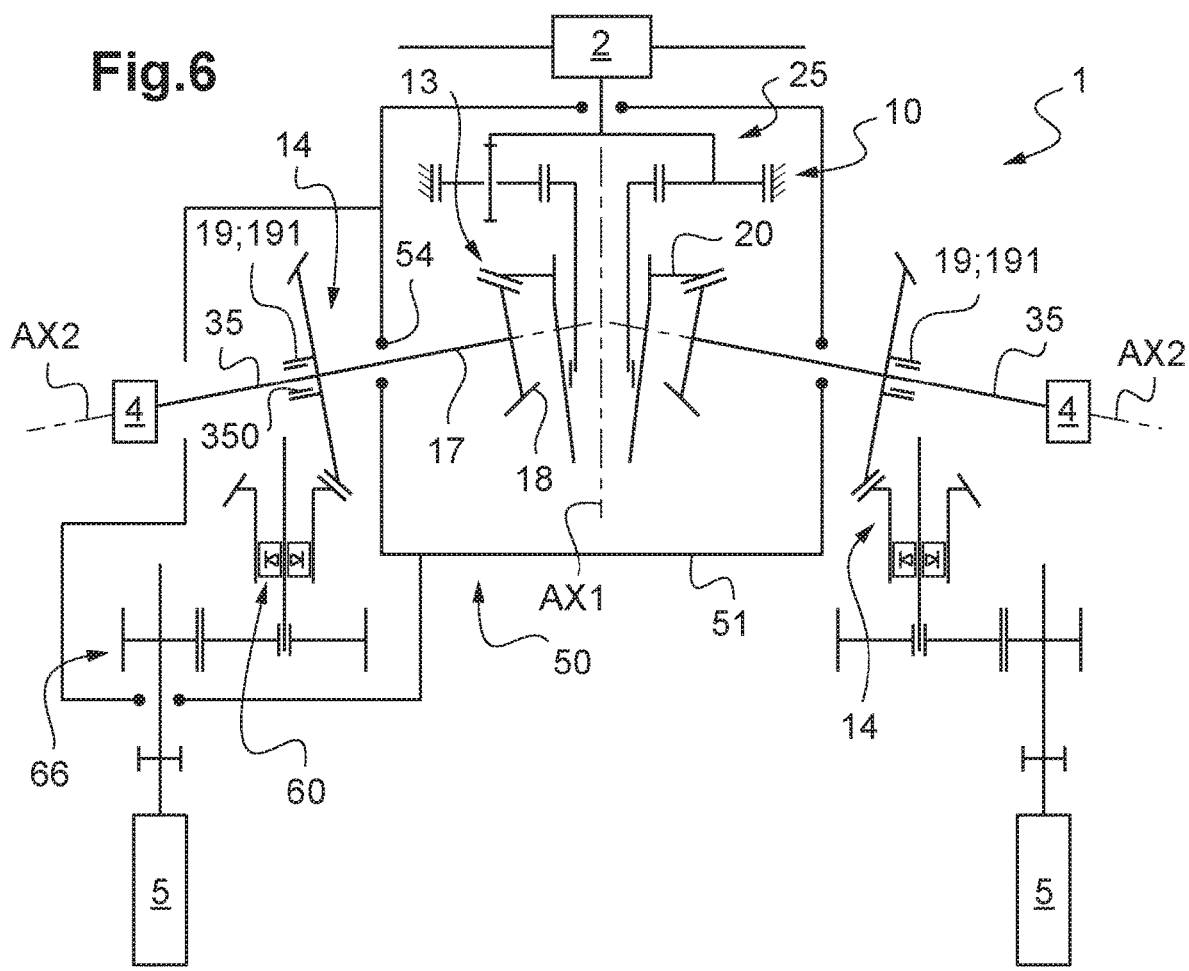
FIG. 6 is a diagram showing a power transmission system of the invention used in a hybrid aircraft architecture.

In a second use of the first embodiment shown in FIG. 6, at least one first additional drivetrain 35 is connected to the corresponding reversible connection means 19.

For example, the rotorcraft may have two engines and two inlet speed-reducing gears 14 and two lateral drivetrains 35.

Consequently, rotation of each inlet speed-reducing gear drives rotation of a lateral rotor 4 via a first additional drivetrain 35.

Each first additional drivetrain 35 serves to rotate a lateral rotor 4 under drive from the reversible connection means 19. Thus, each first additional drivetrain 35 may include at least one shaft and/or gearing and/or angle transmission means and/or freewheels and/or hydraulic distributors and/or hydraulic pumps, . . . .

The additional pinion 40 may be removed in order to lighten the installation, or it may drive at least one accessory module.

Furthermore, in order to enable a first additional drivetrain 35 to be connected, the reversible connection means 19 may include fluting 191 constrained to rotate with an inlet gearwheel.

Under such circumstances, the fluting 191 may be secured to the corresponding inlet gearwheel, or indeed to the connection shaft that is secured to the inlet gearwheel, or to an intermediate shaft that is constrained to rotate with the inlet gearwheel or with the connection shaft. In other words, the reversible connection means are fastened to a two-pinion assembly.

The fluting 191 may extend along a transverse axis AX2 of symmetry of a two-pinion assembly. The fluting 191 co-operates with complementary fluting 350 of a first additional drivetrain 35.

Figure 7:
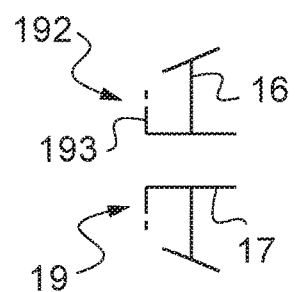
FIG. 7 is a diagram showing reversible connection means provided with screw fastener means.

In the alternative of FIG. 7, the reversible connection means 19 include screw fastener means 192.

By way of example, the screw fastener means 192 comprise a perforated collar 193 secured to an inlet gearwheel 16 or to the connection shaft 17. This collar 193 may also be screw-fastened to an element of a first additional drivetrain 35.

In a second embodiment shown in FIG. 8, the power transmission system 10 has at least one reversible connection means for driving an auxiliary rotor 3 of the yaw movement control rotor type.

Consequently, the power transmission system 10 has an inlet speed-reducing gear 14. This inlet speed-reducing gear 14 possesses an inlet gearwheel 16 and at least one inlet pinion 15.

In particular, and independently of the embodiment, FIG. 8 shows the possibility of driving an inlet gearwheel by means of a plurality of engines 5. Under such circumstances, the inlet speed-reducing gear may for example have two inlet pinions meshing with an inlet gearwheel on a twin-engined aircraft.

Independently of this aspect, when the power transmission system 10 is arranged on a helicopter, the reversible connection means 19 are connected to a first drivetrain 35 in order to drive rotation of the yaw movement control rotor 3.

In contrast, when the power transmission system 10 is mounted on a hybrid helicopter, the reversible connection means 19 are either unused or else used for driving at least one accessory module.

In addition, the power transmission system 10 then includes one additional pinion 40 per lateral rotor 4 that is to be driven. Each additional pinion meshes with the main gearwheel 20 and drives a lateral rotor via a corresponding second drivetrain 41.

The invention then presents the advantage of being able to drive two lateral rotors possibly using only one engine 5 of appropriate power. If two engines are used, a single combining gearwheel may be used, this combining gearwheel being represented by the inlet gearwheel.

Furthermore, FIG. 9 explains the method for designing the dimensions of the transmission system of the invention. Independently of the future use of the power transmission system, the main gearwheel 20 and each main pinion 18 are given dimensions that take into consideration an additional pinion 40 even though it is optional.

Each connection shaft 17 extending along a transverse axis AX2 acts as an axis of symmetry for the main pinion. Likewise, the main gearwheel 20 presents an axis in elevation AX1 of symmetry. Finally, each additional pinion is to be arranged along an axis of rotation AX3.

The axis in elevation AX1 and each transverse axis AX2 and each axis of rotation AX3 coincide at a point 200.

In addition, each transverse axis AX2 is spaced apart from the axis in elevation AX1 by an angle referred to as the "first" angle $\beta 1$. When a plurality of main pinions 18 are arranged, the main pinions 18 all have the same first angle $\beta 1$.

Likewise, the axis in elevation AX1 is spaced apart from the axis of rotation AX3 by an angle referred to as the "second" angle $\beta 2$. When a plurality of additional pinions 40 are arranged, the additional pinions 40 all have the same angle $\beta 2$.

In addition, the main gearwheel 20 presents a number of teeth that is referred to as the "first" number of teeth Z1, each main pinion 18 presenting a number of teeth that is referred to as the "second" number of teeth Z2, and the additional pinion 40 presenting a number of teeth referred to as the "third" number of teeth Z3.

By way of example, the teeth of the main gearwheel 20 may be bevel teeth, lying on a cone, each tooth of the main gearwheel 20 presenting an angle $\alpha 1$ relative to the axis in elevation AX1. By way of example, and likewise, the teeth of each main pinion 18 may be bevel teeth arranged on a cone, each tooth of a main pinion presenting an angle $\alpha 2$ relative to the transverse axis AX2 about which the main pinion rotates. Finally, and by way of example, the teeth of each additional pinion 40 may be bevel teeth arranged on a cone, each tooth of an additional pinion 40 presenting an angle $\alpha 3$ relative to the axis of rotation AX3 about which the additional pinion 40 rotates.

In a determination step, the first and second numbers of teeth Z1 and Z2 are determined as a function: of the first angle $\beta 1$ that is set by the manufacturer; and of a first speed of rotation V1 that is to be reached by the main gearwheel 20, also set by the manufacturer; and of a second speed of rotation V2 that is to be reached by each main pinion 18; and of the third number of teeth Z3; and possibly of a third speed of rotation V3 to be reached by the additional pinion 40; and of the second angle $\beta 2$.

For example, an operator may begin by determining setpoints that are to be satisfied.

Thus, an operator gives a first setpoint angle value $\beta 1^*$ to be satisfied by the first angle $\beta 1$. For example, the first angle value $\beta 1^*$ may be in the form of a range of values, such as 100 degrees plus or minus 1.5 degrees.

Likewise, the operator may give a second setpoint angle value $\beta 2^*$ to be satisfied by the second angle $\beta 2$. For example, the second angle value $\beta 2^*$ may be a single value, possibly equal to 96 degrees.

Furthermore, the operator gives a first setpoint speed of rotation value V1* to be satisfied by the main gearwheel 20. For example, the first setpoint speed of rotation value V1* is equal to 1200 rpm.

Likewise, the operator may give a second setpoint speed of rotation value V2* to be satisfied by each main pinion, and indeed a third setpoint speed of rotation value V3* to be satisfied by the additional pinion. For example, the second setpoint speed of rotation value V2* may set a range of speeds, e.g. a speed of not less than 4500 rpm, and the second setpoint speed of rotation value V3* may set a speed of 6000 rpm plus or minus 200 rpm.

Once the setpoints have been established, the operator specifies at least one combination of numbers of teeth.

Thus, the operator gives a first value to the first number of teeth Z1, a second value to the second number of teeth Z2, and a third value to the third number of teeth Z3.

With this data, and applying conventional rules of calculation, the operator determines a value referred to as the "resulting calculation value" for the first angle $\beta 1$ by applying the first, second, and third values for numbers of teeth as a function of the second setpoint angle value β2*.

For example, the operator specifies the first number of teeth as being 80, the second number of teeth as being 21, and the third number of teeth as being 17. To ensure that the second angle β2 is equal to 96 degrees with the selected numbers of teeth, the first angle β1 must reach a resulting calculation value of 98.9 degrees.

Under such circumstances, the operator compares this resulting calculation value with the first setpoint angle value.

Since this first setpoint angle value in this example is equal to 100 degrees plus or minus 1.5 degrees, the resulting calculation value that is reached is acceptable.

Furthermore, the operator determines a speed of rotation referred to as the "first" speed of rotation of each main pinion, and a speed of rotation referred to as the "second" speed of rotation of each additional pinion as a function of the first setpoint speed of rotation value and of the first number of teeth value, the second number of teeth value, and the third number of teeth value.

In the above example, the first speed of rotation is then equal to 4571 rpm, the second speed of rotation being equal to 5647 rpm.

The operator then compares the first speed of rotation with the second setpoint speed of rotation value. Possibly, the operator compares the second speed of rotation and the third setpoint speed of rotation value.

In the example given, the second setpoint speed of rotation value specifies a speed of rotation of not less than 4500 rpm and the third setpoint speed of rotation value specifies a speed of 6000 rpm plus or minus 200 rpm, so the tested combination turns out not to be satisfactory.

Conversely, other combinations are satisfactory, such as a combination in which the first number of teeth is specified as being 87, the second number of teeth as being 23, and the third number of teeth as being 17.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A power transmission system for a rotorcraft, the power transmission system having at least one inlet speed-reducing gear rotating a main speed-reducing gear, the main speed-reducing gear being for connecting mechanically to a rotor mast for driving a main rotor of the rotorcraft in rotation, the main rotor contributing at least in part to providing the rotorcraft with lift, the at least one inlet speed-reducing gear comprising at least one inlet pinion meshing with an inlet gearwheel, the at least one inlet pinion being for driving by an engine, the main speed-reducing gear having one main pinion per inlet speed-reducing gear, the main speed-reducing gear having one main gearwheel meshing with the main pinion, the main pinion being connected by a connection shaft to the inlet gearwheel, wherein a reversible connector is constrained to rotate about an axis of rotation of the inlet gearwheel, the reversible connector being configured to drive a first additional drivetrain connected to an additional rotor of the rotorcraft.

2. A power transmission system according to claim 1, wherein the power transmission system includes at least one additional pinion meshing with the main gearwheel in order to drive a second additional drivetrain for an auxiliary rotor of the rotorcraft.

3. A power transmission system according to claim 1, wherein the connection shaft extends along a transverse axis of symmetry (AX2), the main gearwheel presenting an axis in elevation (AX1) of symmetry, the transverse axis (AX2) presenting a first angle (β1) relative to the axis in elevation (AX1), the main gearwheel presenting a first number of teeth (Z1), the main pinion presenting a second number of teeth (Z2), the first number of teeth (Z1) and the second number of teeth (Z2) being a function:

of the first angle (β1);
of a first speed of rotation (V1) to be reached by the main gearwheel;
of a second speed of rotation (V2) to be reached by each main pinion;
of a third number of teeth (Z3) of an additional pinion to mesh with the main gearwheel in order to drive a second additional drivetrain for a movement control rotor of the rotorcraft; and
of a second angle (β2) between the axis in elevation (AX1) and an axis of rotation (AX3) of the additional pinion.

4. A power transmission system according to claim 1, wherein the power transmission system includes a secondary speed-reducing gear interposed between the main gearwheel and the rotor mast.

5. A power transmission system according to claim 1, wherein the power transmission system comprises a main gearbox having a casing, and the inlet speed-reducing gear and the main speed-reducing gear are arranged in the casing.

6. A power transmission system according to claim 5, wherein the power transmission system includes an additional pinion engaged with the main gearwheel in order to drive a second additional drivetrain for a movement control rotor of the rotorcraft, the additional pinion being arranged in the casing.

7. A power transmission system according to claim 6, wherein the additional pinion is secured to an outlet shaft projecting outside the casing in order to be suitable for driving the additional drivetrain.

8. A power transmission system according to claim 7, wherein the power transmission system includes an accessory module mechanically connected to the outlet shaft.

9. A power transmission system according to claim 1, wherein the power transmission system includes at least one inlet drivetrain connected to the inlet pinion, the inlet drivetrain being for interposing between the inlet pinion and the engine, the inlet drivetrain comprising at least one member selected from a list comprising a freewheel, a speed-reducing gear, and a speed-increasing gear.

10. A power transmission system according to claim 1, wherein the reversible connector of the inlet speed-reducing gear includes fluting constrained to rotate with the inlet gearwheel.

11. A power transmission system according to claim 1, wherein the reversible connector includes a screw fastener suitable for securing a first drivetrain to the inlet gearwheel.

12. A power transmission system according to claim 1, further comprising the first additional drivetrain for connecting to the additional rotor in the form of a lateral rotor contributing at least in part to propelling the rotorcraft.

13. A power transmission system according to claim 12, wherein the power transmission system includes an additional pinion engaged with the main gearwheel to drive a second additional drivetrain, the second additional drivetrain being for connection to an auxiliary rotor in the form of a yaw movement control rotor of the rotorcraft.

14. A power transmission system according to claim 1, further comprising the first additional drivetrain for connection to an additional rotor in the form of a yaw movement control rotor of the rotorcraft.

15. A power transmission system according to claim 12, wherein the power transmission system includes at least one additional pinion engaging with the main gearwheel to drive a second additional drivetrain, the second additional drivetrain being for connecting to an auxiliary rotor in the form of a lateral rotor that participates at least in part to propelling the rotorcraft.

16. A power transmission system according to claim 1, wherein the power transmission system comprises a two-pinion assembly, the two-pinion assembly comprising the main pinion connected by the connection shaft to the inlet gearwheel, the two-pinion assembly being directly constrained to rotate about an axis of rotation of the inlet gearwheel with the reversible connector.

17. A rotorcraft having the main rotor contributing at least in part to providing the rotorcraft with lift, the rotorcraft having at least two engines in order to drive the main rotor, wherein the rotorcraft includes the power transmission system according to claim 1.

18. A method of designing the power transmission system according to claim 1, wherein the connection shaft extends along a transverse axis of symmetry (AX2), the main gearwheel presenting an axis in elevation (AX1) of symmetry, the transverse axis (AX2) presenting a first angle ($\beta1$) relative to the axis in elevation (AX1), the main gearwheel presenting a first number of teeth (Z1), the main pinion presenting a second number of teeth (Z2), and the method includes a determination step during which the first number of teeth (Z1) and the second number of teeth (Z2) are determined as a function:
- of the first angle ($\beta1$);
- of a first speed of rotation (V1) to be reached by the main gearwheel;
- of a second speed of rotation (V2) to be reached by the main pinion;
- of a third number of teeth (Z3) for an additional pinion that might to mesh with the main gearwheel in order to drive an additional drivetrain for a yaw movement control rotor of a helicopter; and
- of a second angle ($\beta2$) between the axis in elevation (AX1) and an axis of rotation (AX3) of the additional pinion.

19. A method according to claim 18, wherein the method includes the following steps:
- giving a first setpoint angle value to be satisfied by the first angle, and a second setpoint angle value to be satisfied by the second angle;
- giving a first setpoint speed of rotation value to be satisfied by the main gearwheel, and a second setpoint speed of rotation value to be satisfied by the main pinion;
- giving a first value for the first number of teeth;
- giving a second value for the second number of teeth;
- giving a third value for the third number of teeth;
- determining a resulting calculation value by applying the first, second, and third values for numbers of teeth as a function of the second setpoint angle value;
- comparing the resulting calculation value with the first setpoint angle value;
- determining a first speed of rotation for the main pinion as a function of the first setpoint speed of rotation value and of the first, second, and third values for numbers of teeth; and
- comparing the first speed of rotation with the second setpoint speed of rotation value.

20. A power transmission system for a rotorcraft, the power transmission system comprising:
- an engine;
- an inlet speed reducing gear having an inlet pinion in meshed engagement with and driving an inlet gearwheel, the inlet pinion driven by the engine, the inlet gearwheel rotating about an axis of rotation;
- a main speed reducing gear driven by the inlet speed reducing gear, the main speed reducing gear having a main pinion in meshed engagement with and driven by a main gearwheel, the main pinion connected to the inlet gearwheel via a connection shaft, the main speed reducing gear mechanically connected to a rotor mast to drive a main rotor of the rotorcraft in rotation and provide lift for the rotorcraft; and
- a reversible mechanical connector configured to drive a first additional drivetrain connected to an additional rotor of the rotorcraft, the reversible mechanical connector connected to the inlet gearwheel for rotation therewith such that reversible mechanical connector rotates about the axis of rotation of the inlet gearwheel.

* * * * *